US012785102B2

(12) United States Patent
Tashiro

(10) Patent No.: US 12,785,102 B2
(45) Date of Patent: Nov. 3, 2026

(54) ELECTRODE FOR NON-AQUEOUS ELECTROLYTE RECHARGEABLE BATTERY AND NON-AQUEOUS ELECTROLYTE RECHARGEABLE BATTERY

(71) Applicant: SAMSUNG SDI CO., LTD., Yongin-si (KR)

(72) Inventor: Yuta Tashiro, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 797 days.

(21) Appl. No.: 18/191,441

(22) Filed: Mar. 28, 2023

(65) Prior Publication Data

US 2023/0317956 A1 Oct. 5, 2023

(30) Foreign Application Priority Data

Mar. 31, 2022 (JP) ................................. 2022-060935
Feb. 16, 2023 (KR) ........................ 10-2023-0020857

(51) Int. Cl.

*H01M 4/04* (2006.01)
*H01M 4/02* (2006.01)
*H01M 4/583* (2010.01)
*H01M 4/62* (2006.01)
*H01M 50/46* (2021.01)

(52) U.S. Cl.

CPC ......... *H01M 4/623* (2013.01); *H01M 4/0404* (2013.01); *H01M 4/583* (2013.01); *H01M 50/46* (2021.01); *H01M 2004/028* (2013.01)

(58) Field of Classification Search

CPC .... H01M 4/623; H01M 50/46; H01M 4/0404; H01M 4/583; H01M 2004/028; H01M 4/131; H01M 4/668; H01M 10/0525; H01M 4/667; Y02E 60/10

See application file for complete search history.

(56) References Cited

U.S. PATENT DOCUMENTS

2010/0075225 A1 3/2010 Wilkins et al.
2013/0143126 A1* 6/2013 Jung ..................... H01M 4/667 429/231.6
2013/0157129 A1 6/2013 Uemura et al.
2015/0072213 A1* 3/2015 Kaneda ............... H01M 50/414 429/144
2018/0069229 A1 3/2018 Ko et al.
2020/0006778 A1 1/2020 Endo et al.
2020/0044257 A1* 2/2020 Koo .................... H01M 4/0404
2020/0136167 A1 4/2020 Park et al.
2020/0161624 A1* 5/2020 Zeng ..................... H01M 4/667
2021/0043928 A1 2/2021 Yamamoto et al.
2021/0083299 A1* 3/2021 Ozawa .............. H01M 10/0525
2022/0069421 A1 3/2022 Dalton et al.
2022/0190348 A1 6/2022 Kusano et al.
2024/0128461 A1 4/2024 Kakiage et al.

FOREIGN PATENT DOCUMENTS

CN 111710832 A 9/2020
CN 114175347 A 3/2022
EP 2 988 351 A1 2/2016
JP 2009-538495 A 11/2009
JP 2010-3614 A 1/2010
JP 2013533601 A * 8/2013 .............. H01M 4/66
JP 5567429 B2 8/2014
JP 2018-67400 A 4/2018
JP 2018-174098 A 11/2018
JP 2020-509558 A 3/2020
JP 6868835 B2 5/2021
JP 2022-165797 A 11/2022
WO WO 2014/171415 A1 10/2014
WO WO 2020/196372 A1 10/2020
WO 2022/177023 A1 8/2022

OTHER PUBLICATIONS

Extended European Search Report for corresponding European Application No. 23165709.9, dated Sep. 29, 2023, 5pp.
Japanese Office Action for JP Application No. 2022-060935, dated Jan. 22, 2026, 3 pages.
Chinese Office Action, for CN Patent Application No. 202310327840.8, dated May 19, 2026, 5 pages.

* cited by examiner

*Primary Examiner* — Len Tran
*Assistant Examiner* — An Bach Phan
(74) *Attorney, Agent, or Firm* — Womble Bond Dickinson (US) LLP

(57) ABSTRACT

An electrode for a non-aqueous electrolyte rechargeable battery includes a current collector, an electrode mixed material layer, and a conductive base layer between the current collector and the electrode mixed material layer, wherein the base layer includes at least a styrene-acrylic acid ester-based copolymer, a carbon material, and polyacrylic acid, in the base layer, a content of the styrene-acrylic acid ester-based copolymer is greater than or equal to about 45 wt % and less than or equal to about 77.5 wt %, in the polyacrylic acid, a carboxy group is not neutralized or a ratio of a neutralized carboxy group neutralized by alkali metal ions among the carboxy groups is less than or equal to about 25%, and a loading amount of the electrode mixed material layer per one surface of the current collector is greater than or equal to about 15 $mg/cm^2$ and less than or equal to about 70 $mg/cm^2$.

11 Claims, No Drawings

ELECTRODE FOR NON-AQUEOUS ELECTROLYTE RECHARGEABLE BATTERY AND NON-AQUEOUS ELECTROLYTE RECHARGEABLE BATTERY

CROSS-REFERENCE TO RELATED APPLICATION

This application claims priority to and the benefit of Japanese Patent Application No. 2022-060935 filed in the Japan Patent Office on Mar. 31, 2022, and Korean Patent Application No. 10-2023-0020857 filed in the Korean Patent Office on Feb. 16, 2023, the entire contents of each of which are incorporated herein by reference.

BACKGROUND

1. Field

Embodiments of the present disclosure to an electrode for a non-aqueous electrolyte rechargeable battery and a non-aqueous electrolyte rechargeable battery including the electrode.

2. Description of the Related Art

Non-aqueous electrolyte rechargeable batteries including rechargeable lithium ion batteries are widely used as a power source for smart phones, notebook computers, and the like. As electronic devices are smaller and lighter, new high energy density is required or desirable for rechargeable batteries. Nowadays, because a demand thereon also as a power source for electric vehicles or hybrid vehicles, etc. has been increased, high energy density is required or desirable to secure equivalent performance to that of existing gasoline engines.

One method of securing high energy density of rechargeable lithium ion batteries is to increase a loading amount of an electrode mixed material layer.

In general, the electrode mixed material layer is formed by coating and drying electrode mixed material slurry on a current collector foil, but when the loading amount of the electrode mixed material layer is increased, a binder may easily cause migration on the surface thereof, so that the electrode mixed material layer may be easily peeled off or fall off from the current collector foil. Accordingly, the electrode mixed material layer having a large loading amount may be formed utilizing another method of dry-mixing and kneading an electrode mixed material composition and making the electrode mixed material composition into a sheet utilizing a calendering press, etc. and then, bonding the sheet to the current collector foil. Herein, in order to suppress or reduce the detachment or peeling of the electrode mixed material layer from the current collector foil, a method of providing a base layer having conductivity (e.g., electrical conductivity) between the current collector foil and the electrode mixed material layer has been considered.

SUMMARY

Because the base layer of embodiments of the present disclosure is a layer neither including an electrode active material nor contributing to improving energy density of a battery, a thickness of the base layer should be thin in order to realize the high energy density. Because previous studies have not confirmed battery performance during high-temperature storage when the electrode mixed material layer may easily be peeled off or fall off, a base layer suitably or sufficiently suppressing or reducing the detachment or peeling of the electrode mixed material layer during the high-temperature storage is required or desired.

As a response to the aforementioned problems, embodiments of the present disclosure provide an electrode for a non-aqueous electrolyte rechargeable battery having a base layer being suitably thin or thin as much as possible and suppressing or reducing the detachment or peeling of the electrode mixed material layer during high-temperature storage when the electrode mixed material layer is otherwise easily detached or peeled off.

An electrode for a non-aqueous electrolyte rechargeable battery according to an embodiment includes a current collector, an electrode mixed material layer, and a conductive base layer between the current collector and the electrode mixed material layer, wherein the base layer includes at least a styrene-acrylic acid ester-based copolymer, a carbon material, and polyacrylic acid, in the base layer, a content of the styrene-acrylic acid ester-based copolymer is greater than or equal to about 45 wt % and less than or equal to about 77.5 wt %, in the polyacrylic acid, a carboxy group is not neutralized or a ratio of a neutralized carboxy group neutralized by alkali metal ions among the carboxy groups is less than or equal to about 25%, and a loading amount of the electrode mixed material layer per one surface of the current collector is greater than or equal to about 15 $mg/cm^2$ and less than or equal to about 70 $mg/cm^2$. The loading amount may be greater than or equal to about 25 $mg/cm^2$ and less than or equal to about 70 $mg/cm^2$, or greater than or equal to about 30 $mg/cm^2$ and less than or equal to about 50 $mg/cm^2$.

According to the electrode for a non-aqueous electrolyte rechargeable battery configured as described above, even in an electrode having a large loading amount of the electrode mixed material layer per one surface of the current collector, a thickness of the base layer is suitably or sufficiently reduced to a range capable of achieving a suitable or desired high energy density. Even in this case, detachment or peeling of the electrode mixed material layer may be suitably or sufficiently suppressed or reduced.

In an embodiment, the base layer may have a thickness of greater than or equal to about 0.5 μm and less than or equal to about 5 μm. The thickness of the base layer may suitably or desirably be greater than or equal to about 0.5 μm and less than or equal to about 2 μm, and, for example, suitably or desirably greater than or equal to about 0.5 μm and less than or equal to about 1.5 μm.

The styrene-acrylic acid ester-based copolymer may have a glass transition temperature of greater than or equal to about −20° C. and less than or equal to about 15° C.

In order to realize the aforementioned loading amount of the electrode mixed material layer, it is suitable or desirable that the electrode mixed material layer includes greater than or equal to about 0.5 wt % and less than or equal to about 10 wt % of polytetrafluoroethylene.

It is more suitable or desirable that the polyacrylic acid has no neutralized carboxy group, or that the ratio of the neutralized carboxy group in the polyacrylic acid may be greater than about 0% and less than or equal to about 10%.

In the base layer, a content of the styrene-acrylic acid ester-based copolymer may be greater than or equal to about 50 wt % and less than or equal to about 75 wt %.

In an embodiment, the styrene-acrylic acid ester-based copolymer may be a styrene-butyl acrylate-based copolymer and/or a styrene-2-ethylhexyl acrylate-based copolymer.

The carbon material may include at least one selected from furnace black, channel black, thermal black, ketjen black, and acetylene black.

Another embodiment provides a non-aqueous electrolyte rechargeable battery including the positive electrode and the negative electrode, a separator between the positive electrode and the negative electrode, and an electrolyte.

By increasing the loading amount of the positive electrode mixed material layer and reducing the thickness of the base layer as much as possible, high energy density of the non-aqueous electrolyte rechargeable battery is achieved, and at the same time, detachment or peeling of the positive electrode mixed material layer may be suitably or sufficiently suppressed or reduced.

DETAILED DESCRIPTION

Hereinafter, an example configuration of a rechargeable battery according to one or more embodiments will be described.

Basic Configuration of Non-Aqueous Electrolyte Rechargeable Battery

A non-aqueous electrolyte rechargeable battery according to an embodiment is a rechargeable lithium ion battery including a positive electrode, a negative electrode, separator, and a non-aqueous electrolyte. The shape of the rechargeable lithium ion battery is not particularly limited, but may be any suitable shape such as a cylindrical shape, a prismatic shape, a laminated shape, or a button shape.

1-1. Positive Electrode

The positive electrode includes a positive electrode current collector and a positive electrode mixed material layer formed on the positive electrode current collector. The positive electrode current collector may be any suitable conductor, for example, in a plate shape or thin shape, and is suitably or desirably made of aluminum, stainless steel, and/or nickel-plated steel. The positive electrode mixed material layer may include at least a positive electrode active material, and may further include a conductive agent (e.g., an electrically conductive agent) and a positive electrode binder.

The positive electrode active material may be, for example, a transition metal oxide and/or a solid solution oxide containing lithium, and is not particularly limited as long as it can electrochemically intercalate and deintercalate lithium ions. Examples of the transition metal oxide including lithium may include $Li_{1.0}Ni_{0.88}Co_{0.1}Al_{0.01}Mg_{0.01}O_2$ and the like, but besides these, may include Li·Co-based composite oxides such as $LiCoO_2$, Li·Ni·Co·Mn-based composite oxides such as $LiNi_xCo_yMn_zO_2$, Li·Ni-based composite oxides such as $LiNiO_2$, or Li·Mn-based composite oxides such as $LiMn_2O_4$. Examples of the solid solution oxide may include $Li_aMn_xCo_yNi_zO_2$ ($1.150 \le a \le 1.430$, $0.45 \le x \le 0.6$, $0.10 \le y \le 0.15$, $0.20 \le z \le 0.28$), $LiMn_{1.5}Ni_{0.5}O_4$, and the like. In one or more embodiments, a content (content ratio) of the positive electrode active material is not particularly limited, as long as it is applicable to or suitable for the positive electrode mixed material layer of the non-aqueous electrolyte rechargeable battery. Moreover, these compounds may be used independently or a plurality of types (or kinds) may be mixed together and used.

The conductive agent is not particularly limited as long as it is suitable for increasing the conductivity (e.g., electrical conductivity) of the positive electrode. Examples of the conductive agent may include, for example, those containing at least one selected from carbon black, natural graphite, artificial graphite, fibrous carbon, and a nanocarbon material. Examples of the carbon black include furnace black, channel black, thermal black, ketjen black, and acetylene black. Examples of the fibrous carbon include carbon fibers and the like. Examples of the nanocarbon material may include carbon nanotubes, carbon nanofibers, single-layer graphene, and multi-layer graphene. A content of the conductive agent is not particularly limited, and any suitable content applicable to or suitable for the positive electrode mixed material layer of a non-aqueous electrolyte rechargeable battery may be used.

Examples of the positive electrode binder may include a fluorine-containing resin such as polytetrafluoroethylene (PTFE) and polyvinylidene fluoride, an ethylene-containing resin such as a styrene-butadiene rubber, an ethylene-propylene-diene terpolymer, an acrylonitrile-butadiene rubber, a fluororubber, polyvinyl acetate, polymethylmethacrylate, polyethylene, polyvinyl alcohol, carboxymethyl cellulose, a carboxymethyl cellulose derivative (a salt of carboxymethyl cellulose, etc.), or nitrocellulose.

The positive electrode binder is not particularly limited as long as it can bind the positive electrode active material and the conductive agent on the positive electrode current collector, but from the viewpoint of increasing the loading amount of the positive electrode material layer, it is suitable or desirable that the positive electrode mixed material layer includes a fluorine-containing resin such as polytetrafluoroethylene (PTFE) and/or polyvinylidene fluoride as a binder, and the content of the binder in the positive electrode mixed material layer may be suitably or desirably greater than or equal to about 0.5 parts by weight and less than or equal to about 10 parts by weight. When the content of the binder is within the above range, the mechanical strength of the positive electrode mixture layer is improved to the extent that good processability may be secured, and the energy density of the positive electrode plate may be increased.

1-2. Negative Electrode

The negative electrode includes a negative electrode current collector and a negative electrode mixed material layer on the negative electrode current collector. The negative electrode current collector may be any suitable conductor, for example, may have a plate shape or thin shape, and may be suitably or desirably made of copper, stainless steel, and/or nickel-plated steel.

The negative electrode mixed material layer includes at least a negative electrode active material, and may further include a conductive agent (e.g., an electrically conductive agent) and a negative electrode binder. The negative electrode active material is not particularly limited as long as it can electrochemically intercalate and deintercalate lithium ions, but, may be, for example, a graphite active material (artificial graphite, natural graphite, a mixture of artificial graphite and natural graphite, natural graphite coated with artificial graphite, etc.), a Si-based active material and/or a Sn-based active material (for example, a mixture or composite of fine particles of silicon (Si), tin (Sn), and/or oxides thereof and/or graphite active material, fine particles of silicon and/or tin, and/or alloys using silicon and/or tin as a base material), metal lithium, and/or titanium oxide compounds such as $Li_4Ti_5O_{12}$, lithium nitride. As the negative electrode active material, one type (or kind) of the above may be used, or two or more types (or kinds) may be used in combination. In one or more embodiments, oxides of silicon are represented by $SiO_x$ ($0 \le x \le 2$).

The conductive agent is not particularly limited as long as it is suitable for increasing the conductivity (e.g., electrical conductivity) of the negative electrode, and for example, the same as those described in the positive electrode section may be used.

The negative electrode binder may be one capable of binding the negative electrode active material and the conductive agent onto the negative electrode current collector, and is not particularly limited. The negative electrode binder may be, for example, polyvinylidene fluoride (PVDF), polytetrafluoroethylene (PTFE), polyacrylic acid (PAA), a styrene butadiene-based copolymer (SBR), a metal salt of carboxymethylcellulose (CMC) etc. One type (or kind) of binder may be used alone or two or more types (or kinds) may be used.

1-3. Separator

The separator is not particularly limited, and any suitable separator may be used as long as it is used as a separator for a rechargeable lithium ion battery. As the separator, it is suitable or desirable to use a porous film, non-woven fabric, and/or the like that exhibits excellent high-rate discharge performance alone or in combination. The resin constituting the separator may be, for example, a polyolefin-based resin such as polyethylene, polypropylene, etc., a polyester resin such as polyethylene terephthalate, polybutylene terephthalate, etc., polyvinylidene difluoride, a vinylidene difluoride-hexafluoropropylene copolymer, a vinylidene difluoride-perfluorovinylether copolymer, a vinylidene difluoride-tetrafluoroethylene copolymer, a vinylidene difluoride-trifluoroethylene copolymer, a vinylidene difluoride-fluoroethylene copolymer, a vinylidene difluoride-hexafluoroacetone copolymer, a vinylidene difluoride-ethylene copolymer, a vinylidene difluoride-propylene copolymer, a vinylidene difluoride-trifluoro propylene copolymer, a vinylidene difluoride-tetrafluoroethylene copolymer, a vinylidene difluoride-ethylene-tetrafluoroethylene copolymer.

On the other hand, the porosity of the separator is not particularly limited, and it is possible to use any suitable separator having any suitable porosity that is generally used in the art.

On the surface of the separator, there may be a heat-resistant layer containing inorganic particles for improving heat resistance, and/or a layer containing an adhesive for adhering to electrodes to fix battery elements. Examples of the aforementioned inorganic particles include $Al_2O_3$, AlOOH, $Mg(OH)_2$, $SiO_2$, and the like. Examples of the adhesive include a vinylidene difluoride-hexafluoropropylene copolymer, an acid-modified product of vinylidene difluoride polymers, and a styrene-(meth)acrylic acid ester copolymer.

1-4. Non-Aqueous Electrolyte

As the non-aqueous electrolyte, any suitable non-aqueous electrolyte generally used for rechargeable lithium ion batteries may be used without particular limitation. The non-aqueous electrolyte has a composition in which an electrolyte salt is included in a non-aqueous solvent, which is a solvent for the electrolyte. Examples of the non-aqueous solvent may include cyclic carbonate esters such as propylene carbonate, ethylene carbonate, butylene carbonate, chloroethylene carbonate, fluoroethylene carbonate, and vinylene carbonate, cyclic esters such as γ-butyrolactone and γ-valerolactone, chain carbonates such as dimethyl carbonate, diethyl carbonate, or ethylmethyl carbonate, chain esters such as methylformate, methylacetate, methylbutyrate, ethyl propionate, propyl propionate, ethers such as tetrahydrofuran or a derivative thereof, 1,3-dioxane, 1,4-dioxane, 1,2-dimethoxyethane, 1,4-dibutoxyethane, methyldiglyme, ethylene glycol monopropyl ether, or propylene glycol monopropyl ether, nitriles such as acetonitrile and benzonitrile, dioxolane or a derivative thereof, ethylene sulfide, sulfolane, sultone, or a derivative thereof, which may be used alone or in a mixture of two or more. In one or more embodiments, when two or more types (or kinds) of non-aqueous solvents are mixed together and used, a mixing ratio of each non-aqueous solvent may be any suitable mixing ratio that is generally used in the art.

Examples of the electrolyte salt may include an inorganic ion salt including one selected from lithium (Li), sodium (Na), and potassium (K) such as $LiClO_4$, $LiBF_4$, $LiAsF_6$, $LiPF_6$, $LiPF_{6-x}(C_nF_{2n+1})_x$ [provided that $1<x<6$, n=1 or 2], LiSCN, LiBr, LiI, $Li_2SO_4$, $Li_2B_{10}Cl_{10}$, $NaClO_4$, NaI, NaSCN, NaBr, $KClO_4$, KSCN, $NaClO_4$, NaI, NaSCN, NaBr, $KClO_4$, KSCN, an organic ion salt such as $LiCF_3SO_3$, $LiN(CF_3SO_2)_2$, $LiN(C_2F_5SO_2)_2$, $LiN(CF_3SO_2)(C_4F_3SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n\text{-}C_4H_9)_4NClO_4$, $(n\text{-}C_4H_9)_4NI$, $(C_2H_5)_4N$-maleate, $(C_2H_5)_4N$-benzoate, $(C_2H_5)_4N$-phthalate, stearyl lithium sulfonate, octyl lithium sulfonate, dodecylbenzene lithium sulfonate, and the like, and it is also possible to use these ionic compounds alone or in a mixture of two or more types (or kinds). In one or more embodiments, a concentration of the electrolyte salt may be any suitable concentration generally used in the art, and is not particularly limited. In an embodiment, it is suitable or desirable to use a non-aqueous electrolyte containing the above-described lithium compound (electrolyte salt) at a concentration of greater than or equal to about 0.8 mol/L and less than or equal to about 1.5 mol/L.

In one or more embodiments, various suitable additives may be added to the non-aqueous electrolyte. Examples of such additives may include negative electrode-acting action additives, positive electrode-acting additives, ester additives, carbonate ester additives, sulfuric acid ester additives, phosphoric acid ester additives, boric acid ester additives, acid anhydride additives, and electrolyte additives. One or more of these may be added to the non-aqueous electrolyte, and a plurality of types (or kinds) of additives may be added.

2. Characteristic Configuration of Non-Aqueous Electrolyte Rechargeable Battery According to an Embodiment Hereinafter, the characteristic configuration of the non-aqueous electrolyte rechargeable battery according to an embodiment will be described.

2-1. Base Layer

The aforementioned positive electrode also has a base layer. The base layer is provided between the positive electrode current collector and the positive electrode mixed material layer, and prevents or reduces detachment or peeling off of the positive electrode mixed material layer.

The base layer may include a carbon material, a binder (base layer binder), and a dispersant. The carbon material is not particularly limited as long as it is suitable for increasing the conductivity (e.g., electrical conductivity) of the base layer. Examples of the carbon material may include at least one selected from carbon black, natural graphite, artificial graphite, fibrous carbon, and nanocarbon materials. Examples of the carbon black may include furnace black, channel black, thermal black, ketjen black, and acetylene black. Examples of the fibrous carbon may include a carbon fiber and the like. Examples of the nanocarbon material may include carbon nanotubes, carbon nanofibers, single-layer graphene, and multi-layer graphene. Among carbon materials, it is suitable or desirable to use carbon black, which is easy to be dispersed. Among carbon blacks, it is more suitable or desirable to use acetylene black having high conductivity (e.g., high electrical conductivity). A content of the carbon material in the base layer is suitably or desirably greater than or equal to about 17 wt % and less than or equal to about 35 wt %, more suitably or desirably greater than or equal to about 21 wt % and less than or equal to about 32 wt %. When the content of the carbon material is greater than or equal to about 17 wt %, the conductivity (e.g., electrical conductivity) of the base layer is good, and when the content is greater than or equal to about 21 wt %, the conductivity of the base layer is better. Because the content of the aforementioned binder or dispersant for the base layer increases when the content of the carbon material is lowered, the base layer leads to good adhesion and/or improved dispersibility. For this reason, the content of the carbon material is suitably or desirably less than or equal to about 35 wt %, and more suitably or desirably less than or equal to about 32 wt %.

The binder for the base layer binds each component such as a carbon material included in the base layer to each other, and at the same time binds the base layer and the positive electrode current collector or the positive electrode mixed material layer. For example, the binder for the base layer according to an embodiment may be a styrene-acrylic acid ester-based copolymer. The styrene-acrylic acid ester-based copolymer refers to a copolymer formed by polymerizing styrene and acrylic acid ester as a main unit, and for example, may be a copolymer including structural units of styrene and acrylic acid ester in the range of greater than or equal to about 80 wt % and less than or equal to about 99 wt %. The acrylic acid ester may include methyl acrylate, ethyl acrylate, butyl acrylate, isopropyl acrylate, octyl acrylate, 2-ethylhexyl acrylate, isobutyl acrylate, pentyl acrylate, n-hexyl acrylate, isoamyl acrylate, lauryl acrylate, stearyl acrylate, isobornyl acrylate, 2-hydroxyethyl acrylate, 2-hydroxypropyl acrylate, 2-hydroxybutyl acrylate, 2-hydroxy-3-phenoxypropyl acrylate, 2-acryloxyethyl-2-hydroxyethyl-phthalate, ethoxy-diethylene glycol acrylate, methoxy-triethylene glycol acrylate, tetrahydrofurfuryl acrylate, phenoxy-polyethylene glycol acrylate, phenoxy diethylene glycol acrylate, phenoxyethyl acrylate, methoxyethyl acrylate, glycidyl acrylate, acrylonitrile, 2-acrylamide-2-methylpropanesulfonic acid, 2-acryloxyethyl phosphate; and/or the like, and suitably or desirably butyl acrylate and/or 2-ethylhexyl acrylate.

The styrene-acrylic acid ester-based copolymer may include structural units other than styrene and acrylic acid ester in an amount of greater than or equal to about 1 wt % and less than or equal to about 20 wt %. The structural units that the styrene-acrylic acid ester-based copolymer may contain may include structural units when aromatic vinyl compounds such as p-methylstyrene, m-methylstyrene, o-methylstyrene, o-t-butyl styrene, m-t-butyl styrene, p-t-butyl styrene, p-chloro styrene, and/or o-chloro styrene, are polymerized; and/or structural units obtained by polymerization of unsaturated methacrylic acid alkyl ester compounds such as methyl methacrylate, ethyl methacrylate, butyl methacrylate, isopropyl methacrylate, octyl methacrylate, 2-ethylhexyl methacrylate, isobutyl methacrylate, pentyl methacrylate, n-hexyl methacrylate, isoamyl methacrylate, lauryl methacrylate, stearyl methacrylate, and/or isobornyl methacrylate; (meth)acrylic acid compounds such as methacrylic acid, acrylic acid, itaconic acid, fumaric acid, and/or maleic acid; unsaturated carboxylic acid amide compounds such as (meth)acrylamide, (meth)N-methyl acrylamide, (meth)N-dimethyl acrylamide, (meth)N-hydroxymethyl acrylamide, (meth)N-butoxymethylacrylamide, and/or (meth)isobutoxymethyl acrylamide; in addition, 2-hydroxyethyl methacrylate, 2-hydroxypropyl methacrylate, 2-hydroxybutyl methacrylate, 2-hydroxy-3-phenoxypropyl methacrylate, ethoxy-diethylene glycol methacrylate, methoxy-triethylene glycol methacrylate, tetrahydrofurfuryl methacrylate, phenoxy-polyethylene glycol methacrylate, phenoxydiethylene glycol methacrylate, phenoxyethyl methacrylate, methoxylethyl, glycidyl methacrylate, methacrylonitrile, and/or 2-methchlorooxyethyl phosphate.

The glass transition temperature of the styrene-acrylic acid ester-based copolymer may be suitably or desirably less than or equal to about 30° C., and suitably or desirably greater than or equal to about −20° C. When the glass transition temperature is within this range, good adhesion may be obtained even when the positive electrode mixture layer is bonded to the base layer without setting the temperature of the hot roll press to an excessively high temperature, such as exceeding about 100° C. The glass transition temperature of the styrene-acrylic acid ester-based copolymer may suitably or desirably be greater than or equal to about −20° C. and less than or equal to about 15° C., or greater than or equal to about −15° C. and less than or equal to about 15° C., and, for example, suitably or desirably greater than or equal to about −10° C. and less than or equal to about 15° C. The glass transition temperature of the styrene-acrylic acid ester-based copolymer may be controlled by the type (or kind) and content of the constituent units of the copolymer. Because the styrene-acrylic acid ester-based copolymer includes greater than or equal to about 80 wt % and less than or equal to about 99 wt % of structural units obtained by polymerizing styrene and acrylic acid ester, it may be adjusted by the contents of styrene and acrylic acid ester. For example, because the glass transition temperature of a homopolymer of styrene is about 100° C. and the glass transition temperature of a homopolymer of 2-ethylhexyl acrylate is about −55° C., a copolymer having a glass transition temperature between about −55° C. and about 100° C. may be synthesized by adjusting the contents of styrene and 2-ethylhexyl acrylate. In addition, if the glass transition temperature of the homopolymer of the monomer to be used is known, the calculated glass transition temperature may be obtained from a volume fraction of the monomer compound using Fox's equation, the copolymer may be synthesized while referring to it, and differential scanning calorimetry (DSC) is performed to obtain a styrene-acrylic acid ester-based copolymer having a glass transition temperature of greater than or equal to about −20° C. and less than or equal to about 15° C.

It is suitable or desirable that the content of the binder for the base layer in the base layer is greater than or equal to about 45 wt % in order to suitably or sufficiently prevent or reduce detachment or peeling of the positive electrode mixed material layer by the base layer. Further, in order to suitably or sufficiently secure conductivity (e.g., electrical conductivity) of the base layer, the content of the binder for the base layer in the base layer may be suitably or desirably less than or equal to about 77.5 wt %. The content of the binder for the base layer in the base layer may suitably or desirably be greater than or equal to about 50 wt % and less than or equal to about 75 wt %, or greater than or equal to about 60 wt % and less than or equal to about 70 wt %, and, for example, suitably or desirably greater than or equal to about 55 wt % and less than or equal to about 70 wt %.

The dispersant is for uniformly (e.g., substantially uniformly) dispersing the aforementioned carbon material and the binder for the base layer, and in an embodiment, polyacrylic acid corresponds to it. The polyacrylic acid has a plurality of carboxy groups in its molecule, and these carboxy groups are sometimes neutralized by alkali metal ions such as sodium ions. It is suitable or desirable that the polyacrylic acid used in an embodiment is one in which the carboxy group is not neutralized as much as possible. For example, among the carboxyl groups of polyacrylic acid, a ratio of neutralized carboxyl groups (neutralized carboxy groups) may be suitably or desirably less than or equal to about 25%, or less than or equal to about 20%, more suitably or desirably less than or equal to about 10%, and, for example, 0% (e.g., unneutralized). The content of the dispersant in the base layer may be suitably or desirably greater than or equal to about 7 wt % and less than or equal to about 15 wt %, and more suitably or desirably greater than or equal to about 9 wt % and less than or equal to about 14 wt %. When the content of the dispersant is greater than or equal to about 7 wt %, the aforementioned carbon material and the binder for the base layer may be uniformly (e.g., substantially uniformly) dispersed, and when the content is greater than or equal to about 9 wt %, they may be more uniformly dispersed. In one or more embodiments, if the content of the dispersant is reduced, the content of the binder for the base layer or the conductive agent may be increased, which leads to the expression of good adhesion of the base layer or the improvement of battery performance due to low resistance. For this reason, it is suitable or desirable that the content of the dispersant is less than or equal to about 15 wt %, and more suitably or desirably less than or equal to about 14 wt %.

3. Manufacturing Method of Non-Aqueous Electrolyte Rechargeable Battery According to an Embodiment Hereinafter, the manufacturing method of a rechargeable lithium ion battery is described.

3-1. Manufacturing Method of Positive Electrode

A positive electrode according to an embodiment is manufactured as follows. First, a base layer is formed by suspending each component in a solvent such as water and/or the like to prepare a base layer slurry and then, coating and drying the base layer slurry on a positive electrode current collector. Herein, a coating amount of the base layer slurry is adjusted to have a base layer thickness of, for example, greater than or equal to about 0.5 μm to less than or equal to about 5 μm after the drying. The base layer thickness after the drying may be greater than or equal to about 0.5 μm and less than or equal to about 2 μm and, for example, suitably or desirably greater than or equal to about 0.5 μm and less than or equal to about 1.5 μm. A method of the coating has no particular limitation. The coating method may be, for example, a knife coater method, a gravure coater method, a reverse roll coater method, a slit die coater method, and/or the like. Each coating process described below is equally performed.

Subsequently, a positive electrode active material, a conductive agent (e.g., an electrically conductive agent), and a positive electrode binder are mixed together in a suitable or desired ratio and kneaded to prepare a lump of a positive electrode mixed material and compressing this positive electrode mixed material lump into a positive electrode mixed material sheet. This positive electrode mixed material sheet is laminated on the base layer by a hot roll press and/or the like, manufacturing a positive electrode. An apparatus used in the process of laminating the positive electrode mixed material sheet on the base layer in the dry method has no particular limitation. The apparatus used for the process of laminating the positive electrode mixed material sheet on the base layer may be a roll press, a hot roll press device, a dry laminator, a calender processing device, a heat press device, etc. In the laminating process, for example, when the hot roll press is used, a press roll temperature of the hot roll press device may be suitably or appropriately changed depending on materials used for the positive electrode mixed material and the like but suitably or desirably greater than or equal to about 20° C. and less than or equal to about 150° C., suitably or desirably greater than or equal to about 30° C. and less than or equal to about 120° C., and, for example, suitably or desirably greater than or equal to about 40° C. and less than or equal to about 80° C. In addition, a rotation speed of the press roll may be suitably or desirably greater than or equal to about 0.1 m/min and less than or equal to about 10 m/min, suitably or desirably greater than or equal to about 0.1 m/min and less than or equal to about 5 m/min, and, for example, suitably or desirably greater than or equal to about 0.1 m/min and less than or equal to about 1.0 m/min. Because various parameters such as the temperature or the rotation speed of the press roll may have different suitable or desirable ranges depending on an available hot roll press device, the parameters may be adjusted depending on each hot roll press device.

In the lamination of the positive electrode mixed material sheet, the loading amount of the positive electrode mixed material layer per one surface of the positive electrode current collector is adjusted into greater than or equal to about 15 mg/cm$^2$ and less than or equal to about 70 mg/cm$^2$. The loading amount of the positive electrode mixed material layer per one surface of the positive electrode current collector is suitably or desirably greater than or equal to about 25 mg/cm$^2$ and less than or equal to about 70 mg/cm$^2$ and, for example, suitably or desirably greater than or equal to about 30 mg/cm$^2$ and less than or equal to about 50 mg/cm$^2$.

3-2. Manufacturing Method of Negative Electrode

First, materials for forming a negative electrode mixed material layer are mixed together and then, dispersed in a solvent for a negative electrode slurry, preparing the negative electrode slurry. Subsequently, the negative electrode slurry is coated and dried on a negative electrode current collector, forming a negative electrode mixed material layer. The negative electrode mixed material layer is pressed to have a suitable or desired density. Accordingly, a negative electrode is manufactured.

3-3. Manufacturing Method of Non-Aqueous Electrolyte Rechargeable Battery

Subsequently, a separator is interposed between the positive and negative electrodes, manufacturing an electrode body. The electrode body is processed to have a suitable or desired shape (for example, cylindrical, prismatic, laminated, button-type, and the like) and then inserted into a container having the same or substantially the same shape as the electrode body. Subsequently, a non-aqueous electrolyte is inserted into the corresponding container to impregnate the electrolyte into each pore in the separator or a gap between the positive and negative electrodes. Accordingly, a rechargeable lithium ion battery is manufactured.

4. Effect by an Embodiment

The non-aqueous electrolyte rechargeable battery configured as described above may achieve high energy density and concurrently (e.g., simultaneously), suitably or sufficiently suppress or reduce the detachment or peeling of the positive electrode mixed material layer by increasing the loading amount of the positive electrode mixed material layer and in addition, reducing the thickness of the base layer.

5. Another Embodiment of the Present Disclosure

Embodiments of the present disclosure are not limited to the aforementioned embodiments. In the aforementioned examples, the base layer is formed only on one surface of the positive electrode current collector, but the base layer and the positive electrode mixed layer may be formed on both sides of the positive electrode current collector. The embodiment illustrates a case of providing the base layer between the positive electrode current collector and the positive electrode mixed material layer, but the base layer according to embodiments of the present disclosure may be between negative electrode current collector and negative electrode mixed material layer to suppress or reduce detachment or peeling of the negative electrode mixed material layer. The base layer according to embodiments of the present disclosure may not be limited to a non-aqueous electrolyte rechargeable battery having no solid electrolyte layer but applied to a semi-solid rechargeable battery or an all-solid rechargeable battery and the like having a solid electrolyte layer. In addition, embodiments of the present disclosure are not limited to these embodiments but may be variously modified without deviating from the purpose of embodiments of the present disclosure.

Examples

Hereinafter, embodiments of the present disclosure will be described in more detail according to examples. However, the following examples are merely examples of embodiments of the present disclosure, and the present disclosure is not limited to the following examples.

Preparation of Base Layer Slurry

First, Dispersions 1 to 5 below were prepared and then, used to prepare Base layer slurries 1 to 37. Types of a dispersant used in preparing each dispersion are shown in Table 1 below, and a composition of each dispersion is shown in Table 2. In addition, types of a binder used in each base layer slurry are shown in Table 3, and a composition of each base layer slurry is shown in Table 4 below. Base layer slurries 36 and 37 were prepared in substantially the same manner as Base layer slurry 9 of Table 4 except that a glass transition temperature of a binder for a base layer was different. Base layer slurry 36 used (B-4) shown in Table 3-2 as a binder for a base layer. In addition, Base layer slurry 37 used (B-5) shown in Table 3-2 as a binder for a base layer.

Preparation of Dispersion 1

70.0 g of acetylene black, 150 g of an aqueous solution including 20.0 wt % of Dispersant (A-1) (a mass of solids was 30 g when water was removed from the aqueous solution), and 1030 g of water were mixed together by using a disper (i.e., a high-speed mixer) at 3000 rpm for 20 minutes. The resultant mixture was subjected to a high-pressure dispersion treatment under a pressure of 80 MPa by using NanoVator manufactured by Yoshida Kogyo Machinery Co., Ltd. The high-pressure dispersion treatment was three times repeated to obtain acetylene black dispersion (Dispersion 1). As a result of drying and weighing Dispersion 1, a content (solid concentration) of a dried material in the dispersion was about 8 wt %.

Preparation of Dispersions 2 to 4

Dispersions 2 to 4 were prepared in substantially the same manner as in Dispersion 1 except that Dispersant A-1 used in Dispersion 1 was changed into Dispersant A-2, A-3, and A-4, respectively.

Preparation of Dispersion 5

70.0 g of acetylene black, 600 g of an aqueous solution of 5.0 wt % of Dispersant A-5 (a mass of a solid was 30 g when water was removed from the aqueous solution), and 580 g of water were mixed together by using a disper at 3000 rpm for 20 minutes. The resultant mixture was subjected to a high-pressure dispersion treatment under a pressure of 80 MPa by using NanoVator manufactured by Yoshida Kogyo Machinery Co., Ltd. The high-pressure dispersion treatment was three times repeated to obtain acetylene black dispersion (Dispersion 5). As a result of drying and weighing Dispersion 5, a content (solid concentration) of a dried material in the dispersion was about 8 wt %

TABLE 1

| Dispersant | Resin | Neutralization degree (%) | Neutralization ion |
|---|---|---|---|
| (A-1) | polyacrylic acid | 0 | — |
| (A-2) | partially neutralized polyacrylic acid | 10 | Na |
| (A-3) | partially neutralized polyacrylic acid | 25 | Na |
| (A-4) | partially neutralized polyacrylic acid | 50 | Na |
| (A-5) | sodium carboxylmethyl cellulose | — | — |

TABLE 2

| | Conductive filler | | Dispersant | |
|---|---|---|---|---|
| Dispersion | Material | Dried material Mass by part | Material | Dried material Mass by part |
| 1 | acetylene black | 70 | A-1 | 30 |
| 2 | acetylene black | 70 | A-2 | 30 |
| 3 | acetylene black | 70 | A-3 | 30 |
| 4 | acetylene black | 70 | A-4 | 30 |
| 5 | acetylene black | 70 | A-5 | 30 |

Preparation of Base Layer Slurry 1

30.0 g of resin particulate dispersion of Binder (B-1) having 40.0 wt % of a dried material content (solid concentration) and 100 g of Dispersion 1 were weighed and put into a vessel for stirring. The stirring vessel was attached to a rotation·revolution mixer ARE-310 made by THYNKY, Inc. and then, stirred at 400 rpm for 10 minutes, obtaining Base Layer Slurry 1. After drying Base Layer Slurry 1 into a dried material, as a result of weighing the dried material, a content (solid concentration) of the dried material was about 15% in the base layer slurry.

Preparation of Base Layer Slurries 2-37

Base Layer Slurries 2 to 37 were prepared in substantially the same manner as in the aforementioned method (Base layer slurry 1) except that the binder and acetylene black dispersion were weighed to have each composition shown in Table 4. As a result of drying and then, weighing the obtained slurry, the solid concentrations thereof were all about 15%.

Coating of Base Layer Slurries

Slurries of Base Layer Compositions 1 to 37 obtained in the aforementioned method were respectively coated on one side of an about 15 μm-thick aluminum foil (A3003-H18). The coating was performed by using a micro gravure coater to form a base layer having a film thickness of 0.5 μm to 2

μm. The drying was performed at 80° C. for 1 minute. Slurries of Base Layer Compositions 8, 13, 18, 22, 31, 33, and 35 were not gravure-coated, which scratched the aluminum foil. Each base layer of these compositions was coated to both sides of the aluminum foil to have a predetermined film thickness and then, dried in a thermostat at 80° C. for 1 minute.

Performance Evaluation Experiment for Base Layer Slurries

Evaluation Method of Coating Property of Base Layer Slurries

When each slurry of Base Layer Compositions 1 to 37 was coated to have a film thickness of 0.5 μm to 2 μm with a gravure coater, the obtained base layers were evaluated with respect to whether or not they were coated into a target film thickness after the drying. In addition, the base layers were evaluated with naked eyes with respect to whether or not coating defects such as warpage, pinholes, and the like occurred. Specifically, an area of an uncoated portion was visually observed.

Evaluation Criteria for Coating Property of Base Layer Slurries

When the uncoated portion was less than 10% based on 100% of an area where each slurry for a base layer contacted the current collector foil, 0 was given. When the uncoated portion was greater than or equal to 10%, X was given. The results are shown in Table 4 below.

TABLE 3

| Binder | Resin |
|---|---|
| (B-1) | styrene-acrylic acid 2-ethylhexyl-based copolymer |
| (B-2) | styrene-acrylic acid butyl-based copolymer |
| (B-3) | styrene-butadiene-based copolymer |

| Binder | Resin | Glass transition temperature (° C.) |
|---|---|---|
| (B-1) | styrene-acrylic acid 2-ethylhexyl-based copolymer | 15 |
| (B-4) | styrene-acrylic acid 2-ethylhexyl-based copolymer | 0 |
| (B-5) | styrene-acrylic acid 2-ethylhexyl-based copolymer | −25 |

TABLE 4

| Base layer composition | Binder | | Dispersion | | |
|---|---|---|---|---|---|
| | Material | Dried material Mass by part | Composition | Dried material Mass by part | Gravure printing |
| 1 | (B-1) | 50 | 1 | 50 | ○ |
| 2 | (B-1) | 50 | 2 | 50 | ○ |
| 3 | (B-1) | 50 | 3 | 50 | ○ |
| 4 | (B-1) | 55 | 1 | 45 | ○ |
| 5 | (B-1) | 55 | 2 | 45 | ○ |
| 6 | (B-1) | 55 | 3 | 45 | ○ |
| 7 | (B-1) | 55 | 4 | 45 | ○ |
| 8 | (B-1) | 55 | 5 | 45 | x |
| 9 | (B-1) | 60 | 1 | 40 | ○ |
| 10 | (B-1) | 60 | 2 | 40 | ○ |
| 11 | (B-1) | 60 | 3 | 40 | ○ |
| 12 | (B-1) | 60 | 4 | 40 | ○ |
| 13 | (B-1) | 60 | 5 | 40 | x |
| 14 | (B-1) | 70 | 1 | 30 | ○ |
| 15 | (B-1) | 70 | 2 | 30 | ○ |
| 16 | (B-1) | 70 | 3 | 30 | ○ |
| 17 | (B-1) | 70 | 4 | 30 | ○ |
| 18 | (B-1) | 70 | 5 | 30 | x |
| 19 | (B-1) | 75 | 1 | 25 | ○ |
| 20 | (B-1) | 75 | 2 | 25 | ○ |
| 21 | (B-1) | 75 | 3 | 25 | ○ |

TABLE 4-continued

| Base layer composition | Binder | | Dispersion | | |
|---|---|---|---|---|---|
| | Material | Dried material Mass by part | Composition | Dried material Mass by part | Gravure printing |
| 22 | (B-1) | 75 | 5 | 25 | x |
| 23 | (B-1) | 80 | 1 | 20 | ○ |
| 24 | (B-1) | 80 | 2 | 20 | ○ |
| 25 | (B-1) | 80 | 3 | 20 | ○ |
| 26 | (B-2) | 70 | 1 | 30 | ○ |
| 27 | (B-2) | 70 | 2 | 30 | ○ |
| 28 | (B-2) | 70 | 3 | 30 | ○ |
| 29 | (B-2) | 70 | 4 | 30 | ○ |
| 30 | (B-3) | 50 | 1 | 50 | ○ |
| 31 | (B-3) | 50 | 5 | 50 | x |
| 32 | (B-3) | 60 | 1 | 40 | ○ |
| 33 | (B-3) | 60 | 5 | 40 | x |
| 34 | (B-3) | 70 | 1 | 30 | ○ |
| 35 | (B-3) | 70 | 5 | 30 | x |

Manufacture of Positive Electrode Mixed Material Sheet

Manufacture of Positive Electrode Mixed Material Sheet 1

Powders of $LiNi_{0.8}Co_{0.1}Al_{0.1}O_2$, acetylene black, and polytetrafluoro ethylene were weighed in a mass ratio of 93.0:3.5:3.5 and then, kneaded in a mortar for 10 minutes. A massive positive electrode mixed material after the kneading was passed through two rolls about 100 times, thereby manufacturing a positive electrode mixed material sheet having a film thickness of about 150 μm and a density of 2.9 g/cm$^3$ to 3.1 g/cm$^3$. In the process of passing the massive positive electrode mixed material through two rolls about 100 times, a gap between the two rolls was gradually narrowed from 3 mm finally down to about 0.1 mm. The positive electrode mixed material sheet obtained in the method was compressed by using a hot roll press to adjust a positive electrode mixed material density of the positive electrode mixed material sheet to 3.6 g/cm$^3$ and a loading amount of a positive electrode mixed material layer to 35.0 mg/cm$^2$. The hot roll was set at a temperature of 40° C. and rotated at a rotation speed of 0.5 m/min. The roll gap was adjusted to 10 μm, and the positive electrode mixed material sheet having a dimension of 3.0 cm×8.0 cm was passed through in a length direction twice. Subsequently, the roll gap was adjusted to 5 μm, and the positive electrode mixed material sheet was passed through twice. In the compressing process, a total pressure was 0.3 kN, and a linear pressure was 10 kN/m. The positive electrode mixed material sheet was pierced into 15.5 mmφ, and then, measured with respect to a weight and a film thickness, wherein the film thickness was about 100 μm, thereby obtaining a positive electrode mixed material density of about 3.6 g/cm$^3$, and a loading amount of about 35.0 mg/cm$^2$.

Manufacture of Positive Electrode

Example 1

The positive electrode mixed material sheet manufactured in the above method was adhered onto a current collector foil by using a hot roll press. Herein, hot rolls were set at a temperature of 60° C. and at a rotation speed of 0.5 m/min. A gap between the rolls was adjusted to 60 μm, and Positive electrode Mixed Material Sheet 1 was placed on the base layer having a film thickness of 1 μm (Base Layer Composition 9) coated on the current collector foil and then, passed through the rolls once. A rotation speed condition of the rolls used in each example and comparative example might have an error of about ±0.2 m per minute, which had no influence on properties of the positive electrode mixed material sheets. In addition, the roll gap condition used in each example and comparative example might have an error of about ±10 μm, which was not particularly a problem. The adhesion process was performed under a total pressure of 0.3 kN and a linear pressure of 10 kN/m. The positive electrode manufactured as above was dried in a vacuum drier at 80° C. for 6 hours. After the vacuum-drying, the positive electrode was pierced into 15.5 mmφ and then, measured with respect to a weight and a film thickness, thereby obtaining a positive electrode mixed material density of about 3.6 g/cm$^3$ and a loading amount of about 35.0 mg/cm$^2$.

Examples 2 to 27 and Comparative Examples 1 to 23

Positive electrodes were manufactured in substantially the same method as in Example 1 except that the combination of the base layer and the positive electrode mixed material sheet, the thickness of each layer, and the like were changed as shown in Table 5. The roll gap was adjusted to have a value obtained by the following calculation according to a loading amount of the positive electrode mixed material sheet.

(roll gap)=(loading amount of positive electrode mixed material sheet)÷35×60 μm

Performance Evaluation Experiment for Each Positive Electrode of Examples 1 to 27 and Comparative Examples 1 to 23

Evaluation Method for Electrode Warpage

The positive electrodes according to Examples 1 to 27 and Comparative Examples 1 to 23 were pierced into 13 mmφ and examined with a digital microscope (VHX5000 manufactured by Keyence Co., Ltd.) and then, evaluated with respect to a warpage degree of the electrodes by making a curl of the positive electrodes. A method of calculating the curl is as follows. A convex portion of the warped positive electrode was facing up and placed on a flat plate horizontally positioned. A maximum distance from the surface of the flat plate to the surface of the positive electrode facing the flat plate was ΔZ, a point on the positive electrode where the maximum distance was measured was A, and a length twice longer than a distance from the flat plate closest to the point A to a contact point of the flat plate with the positive electrode in the horizontal direction was x, which were used according to the following formula (1) to obtain a curl (%).

$$(\text{Curl})=\Delta Z \div x \times 100\% \qquad (1)$$

Evaluation Criteria for Electrode Warpage

As described above, when the obtained curl was less than 10%, positive electrode warpage was evaluated as ○. When the obtained curl was greater than or equal to 10%, the positive electrode warpage was evaluated as x. The results are shown in Table 5.

Evaluation Method of Close Contacting Property of Positive Electrode Mixed Material Layer to Positive Electrode Current Collector The positive electrodes according to Examples 1 to 27 and Comparative Examples 1 to 23 were cut into a rectangle having a width of 25 mm and a length of 80 mm. Subsequently, a double-sided adhesive tape was used to attach the surface of the positive electrode mixed material layer of the positive electrode to a stainless steel plate, thereby preparing a sample for evaluating close contacting properties.

The sample for evaluating close contacting properties was mounted in a peeling tester (EZ-S, Shimazu Scientific Instruments) and then, measured with respect to peel strength with a length of 60 mm at 180° by setting a peeling speed at 100 mm/min.

Evaluation Criteria of Close Contacting Property of Positive Electrode Mixed Material Layer to Positive Electrode Current Collector When the peel strength was greater than or equal to 4.0 g/mm, the close contacting property was evaluated as ◎. When greater than or equal to 3.0 g/mm and less than 4.0 g/mm, the close contacting property was evaluated as ○, and when less than 3.0 g/mm, the close contacting property was evaluated as x. The results are shown in Table 5.

Evaluation Method of Electrode Resistance

The positive electrodes according to Examples 1 to 27 and Comparative Examples 1 to 23 were measured with respect to electrode interface resistance, which is interface resistance between positive electrode mixed material layers and positive electrode current collectors, by using an electrode resistance measuring device (XF057, Hioki Co., Ltd.). The measurement was performed at a voltage of 5 V and a current of 0.1 mA.

Evaluation Criteria of Electrode Resistance

When an interface resistance of an electrode was less than 25% compared with that of Comparative Example 1, ◎ was given. When an interface resistance of an electrode was greater than or equal to 25% and less than 50% compared with that of Comparative Example 1, ○ was given. The other electrode resistances were evaluated as x. The results are shown in Table 5.

Manufacture of Rechargeable Battery Cells

After welding each positive electrode according to Examples 1 to 27 and Comparative Examples 1 to 23 and a Li metal-pressed copper foil respectively with an aluminum wire and a nickel wire, a polyethylene porous separator was interposed therebetween and then, laminated therewith with one positive electrode and one negative electrode facing each other, manufacturing an electrode laminate. Subsequently, the electrode laminate was housed in an aluminum laminate film having the lead wire pulled out, and, after injecting an electrolyte thereinto, the film was sealed under a reduced pressure, manufacturing a rechargeable battery cell before initial charge. The electrolyte was prepared by dissolving 1.15 M $LiPF_6$ and 1.0 wt % of vinylene carbonate in a mixed solvent of ethylene carbonate/dimethyl carbonate/ethyl methyl carbonate mixed together in a volume ratio of 20/20/40.

Evaluation Method of Resistance Increase During High-Temperature Storage

Each rechargeable battery cell manufactured by using the positive electrodes according to Examples 1 to 27 and Comparative Examples 1 to 23 was one cycle constant current-charged at 0.1 CA, constant voltage-charged at 0.05 CA, and constant current-discharged at 0.1 CA under conditions of charge cut-off voltage of 4.25 V and a discharge cut-off voltage of 3.0 V in a thermostat at 25° C. Subsequently, the cell was one cycle constant current-charged at 0.2 CA, constant voltage-charged at 0.05 CA, and constant current-discharged at 0.2 CA under conditions of a charge cut-off voltage of 4.25 V and a discharge cut-off voltage of 3.0 V. Then, the cell was constant current-charged at 0.2 CA and constant voltage-charged at 0.05 CA under a condition of a charge cut-off voltage of 4.25 V. In addition, the rechargeable battery cell was made to reach a full-charge state. The rechargeable battery cell in the full charge was measured with respect to a cell voltage and 1 kHz impedance by using a battery tester and then, stored in the thermostat at 60° C. The stored rechargeable battery cell in the full charge state was cooled to room temperature at the $1^{st}$, $3^{rd}$, $7^{th}$, and $14^{th}$ day and then, measured with respect to OCV and 1 kHz impedance by using the battery tester.

Evaluation Criteria for Resistance Increase During High-Temperature Storage

An increase in resistance during the high-temperature storage was calculated according to the following equation (3).

(Resistance increase during high-temperature storage)=(1 kHz impedance of rechargeable battery cell measured on the 14th day of high-temperature storage)÷(1 kHz impedance of rechargeable battery cell measured immediately before high-temperature storage)×100% Equation (3)

When the increase in resistance was less than 120%, ⊚ was given. When the increase in resistance was greater than or equal to 120% and less than 150%, ○ was given. When the increase in resistance was greater than or equal to 150%, x was given. The results are shown in Table 5.

(Evaluation Method of Voltage Drop During High-Temperature Storage)

A voltage drop during the high-temperature storage was calculated according to the following equation (4).

(voltage drop during high-temperature storage)=(OCV of rechargeable battery cell measured immediately before high-temperature storage)−(OCV of rechargeable battery cell measured on the 14th day of high-temperature storage) Equation (4)

When the voltage drop was less than 0.08 V, ⊚ was given. When the voltage drop was greater than or equal to 0.08 V and less than 0.1 V, ○ was given. When the voltage drop was greater than or equal to 0.1 V, x was given. The results are shown in Table 5.

TABLE 5

| | Base layer compo-sition | Binder Material | Binder Dried material Mass by part | Dispersion Conductive filler | Dispersion Disper-sant | Dispersion Neutral-ization degree (%) | Dispersion Dried material Mass by part | Thickness of base Layla film (μm) | Loading amount of positive electrode mixture layer (mg/cm$^2$) | Coating properties | Electrode warpage | Close contacting property | Resistance Electrode resistance | Resistance increase during high-temperature storage | Resistance Voltage drop during high-temperature storage |
|---|---|---|---|---|---|---|---|---|---|---|---|---|---|---|---|
| Ex. 1 | 9 | B-1 | 60 | Acetylene black | A-1 | 0 | 40 | 1 | 35.0 | ○ | ○ | ◎ | ◎ | ◎ | ◎ |
| Ex. 2 | 9 | B-1 | 60 | " | A-1 | 0 | 40 | 1 | 37.5 | ○ | ○ | ◎ | ◎ | ◎ | ◎ |
| Ex. 3 | 9 | B-1 | 60 | " | A-1 | 0 | 40 | 1 | 40.0 | ○ | ○ | ◎ | ◎ | ◎ | ◎ |
| Ex. 4 | 9 | B-1 | 60 | " | A-1 | 0 | 40 | 1 | 45.0 | ○ | ○ | ◎ | ◎ | ◎ | ◎ |
| Ex. 5 | 9 | B-1 | 60 | " | A-1 | 0 | 40 | 1 | 50.0 | ○ | ○ | ◎ | ◎ | ◎ | ◎ |
| Ex. 6 | 9 | B-1 | 60 | " | A-1 | 0 | 40 | 1 | 30.0 | ○ | ○ | ◎ | ◎ | ◎ | ◎ |
| Ex. 7 | 9 | B-1 | 60 | " | A-1 | 0 | 40 | 1 | 32.5 | ○ | ○ | ◎ | ◎ | ◎ | ◎ |
| Ex. 8 | 9 | B-1 | 60 | " | A-1 | 0 | 40 | 0.5 | 35.0 | ○ | ○ | ◎ | ◎ | ◎ | ◎ |
| Ex. 9 | 9 | B-1 | 60 | " | A-1 | 0 | 40 | 0.7 | 35.0 | ○ | ○ | ◎ | ◎ | ◎ | ◎ |
| Ex. 10 | 9 | B-1 | 60 | " | A-1 | 0 | 40 | 1.5 | 35.0 | ○ | ○ | ◎ | ◎ | ◎ | ◎ |
| Ex. 11 | 9 | B-1 | 60 | " | A-1 | 0 | 40 | 2 | 35.0 | ○ | ○ | ◎ | ◎ | ◎ | ◎ |
| Ex. 12 | 1 | B-1 | 50 | " | A-1 | 0 | 50 | 1 | 35.0 | ○ | ○ | ○ | ◎ | ◎ | ◎ |
| Ex. 13 | 2 | B-1 | 50 | " | A-2 | 10 | 50 | 1 | 35.0 | ○ | ○ | ○ | ◎ | ◎ | ◎ |
| Ex. 14 | 3 | B-1 | 50 | " | A-3 | 25 | 50 | 1 | 35.0 | ○ | ○ | ○ | ◎ | ○ | ○ |
| Ex. 15 | 4 | B-1 | 55 | " | A-1 | 0 | 45 | 1 | 35.0 | ○ | ○ | ◎ | ◎ | ◎ | ◎ |
| Ex. 16 | 5 | B-1 | 55 | " | A-2 | 10 | 45 | 1 | 35.0 | ○ | ○ | ◎ | ◎ | ◎ | ◎ |
| Ex. 17 | 6 | B-1 | 55 | " | A-3 | 25 | 45 | 1 | 35.0 | ○ | ○ | ◎ | ◎ | ○ | ○ |
| Ex. 18 | 10 | B-1 | 60 | " | A-2 | 10 | 40 | 1 | 35.0 | ○ | ○ | ◎ | ◎ | ◎ | ◎ |
| Ex. 19 | 11 | B-1 | 60 | " | A-3 | 25 | 40 | 1 | 35.0 | ○ | ○ | ◎ | ◎ | ○ | ○ |
| Ex. 20 | 14 | B-1 | 70 | " | A-1 | 0 | 30 | 1 | 35.0 | ○ | ○ | ◎ | ◎ | ◎ | ◎ |
| Ex. 21 | 15 | B-1 | 70 | " | A-2 | 10 | 30 | 1 | 35.0 | ○ | ○ | ◎ | ◎ | ◎ | ◎ |
| Ex. 22 | 16 | B-1 | 70 | " | A-3 | 25 | 30 | 1 | 35.0 | ○ | ○ | ◎ | ◎ | ○ | ○ |
| Ex. 23 | 19 | B-1 | 75 | " | A-1 | 0 | 25 | 1 | 35.0 | ○ | ○ | ◎ | ○ | ◎ | ◎ |
| Ex. 24 | 20 | B-1 | 75 | " | A-2 | 10 | 25 | 1 | 35.0 | ○ | ○ | ◎ | ○ | ◎ | ◎ |
| Ex. 25 | 21 | B-1 | 75 | " | A-3 | 25 | 25 | 1 | 35.0 | ○ | ○ | ◎ | ○ | ○ | ○ |
| Ex. 26 | 26 | B-2 | 70 | " | A-1 | 0 | 30 | 1 | 35.0 | ○ | ○ | ◎ | ◎ | ○ | ○ |
| Ex. 27 | 27 | B-2 | 70 | " | A-2 | 10 | 30 | 1 | 35.0 | ○ | ○ | ◎ | ◎ | ○ | ○ |
| Ex. 28 | 28 | B-2 | 70 | " | A-3 | 25 | 30 | 1 | 35.0 | ○ | ○ | ◎ | ◎ | ○ | ○ |
| Ex. 29 | 36 | B-4 | 60 | " | A-1 | 0 | 40 | 1 | 35.0 | ○ | ○ | ◎ | ◎ | ◎ | ◎ |
| Comp. Ex. 1 | — | — | — | — | — | — | — | — | 35.0 | — | ○ | X | X | X | X |
| Comp. Ex. 2 | 23 | B-1 | 80 | " | A-1 | 0 | 20 | 1 | 35.0 | ○ | X | ◎ | X | ◎ | ◎ |
| Comp. Ex. 3 | 24 | B-1 | 80 | " | A-2 | 10 | 20 | 1 | 35.0 | ○ | X | ◎ | X | ◎ | ◎ |
| Comp. Ex. 4 | 25 | B-1 | 80 | " | A-3 | 25 | 20 | 1 | 35.0 | ○ | X | ◎ | X | ○ | ○ |
| Comp. Ex. 5 | 7 | B-1 | 55 | " | A-4 | 50 | 45 | 1 | 35.0 | ○ | ○ | ◎ | ◎ | X | X |
| Comp. Ex. 6 | 12 | B-1 | 60 | " | A-4 | 50 | 40 | 1 | 35.0 | ○ | ○ | ◎ | ◎ | X | X |

TABLE 5-continued

| | Base layer composition | Binder | | Dispersion | | | | Thickness of base Layla film (μm) | Loading amount of positive electrode mixture layer (mg/cm$^2$) | Coating properties | Electrode warpage | Close contacting property | Electrode resistance | Resistance | |
|---|---|---|---|---|---|---|---|---|---|---|---|---|---|---|---|
| | | Material | Dried material Mass by part | Conductive filler | Dispersant | Neutralization degree (%) | Dried material Mass by part | | | | | | | increase during high-temperature storage | Voltage drop during high-temperature storage |
| Comp. Ex. 7 | 17 | B-1 | 70 | ″ | A-4 | 50 | 30 | 1 | 35.0 | ○ | ○ | ◎ | ◎ | X | X |
| Comp. Ex. 8 | 29 | B-2 | 70 | ″ | A-4 | 50 | 30 | 1 | 35.0 | ○ | ○ | ◎ | ◎ | X | X |
| Comp. Ex. 9 | 8 | B-1 | 55 | ″ | A-5 | — | 45 | 1 | 35.0 | X | ○ | ◎ | ◎ | ◎ | ◎ |
| Comp. Ex. 10 | 13 | B-1 | 60 | ″ | A-5 | — | 40 | 1 | 35.0 | X | ○ | ◎ | ◎ | ◎ | ◎ |
| Comp. Ex. 11 | 18 | B-1 | 70 | ″ | A-5 | — | 30 | 1 | 35.0 | X | ○ | ◎ | ◎ | ◎ | ◎ |
| Comp. Ex. 12 | 22 | B-1 | 75 | ″ | A-5 | — | 25 | 1 | 35.0 | X | ○ | ◎ | ○ | ◎ | ◎ |
| Comp. Ex. 13 | 31 | B-3 | 50 | ″ | A-1 | 0 | 50 | 1 | 35.0 | ○ | ○ | X | ◎ | X | X |
| Comp. Ex. 14 | 31 | B-3 | 50 | ″ | A-5 | — | 50 | 1 | 35.0 | X | ○ | X | ◎ | X | X |
| Comp. Ex. 15 | 32 | B-3 | 60 | ″ | A-1 | 0 | 40 | 1 | 35.0 | ○ | ○ | X | ◎ | X | X |
| Comp. Ex. 16 | 32 | B-3 | 60 | ″ | A-1 | 0 | 40 | 2 | 35.0 | ○ | ○ | X | ◎ | X | X |
| Comp. Ex. 17 | 33 | B-3 | 60 | ″ | A-5 | — | 40 | 1 | 35.0 | X | ○ | X | ◎ | X | X |
| Comp. Ex. 18 | 33 | B-3 | 60 | ″ | A-5 | — | 40 | 2 | 35.0 | X | ○ | X | ◎ | X | X |
| Comp. Ex. 19 | 34 | B-3 | 70 | ″ | A-1 | 0 | 30 | 1 | 35.0 | ○ | ○ | X | ◎ | X | X |
| Comp. Ex. 20 | 34 | B-3 | 70 | ″ | A-1 | 0 | 30 | 2 | 35.0 | ○ | ○ | X | ◎ | X | X |
| Comp. Ex. 21 | 35 | B-3 | 70 | ″ | A-5 | — | 30 | 1 | 35.0 | X | ○ | X | ◎ | X | X |
| Comp. Ex. 22 | 35 | B-3 | 70 | ″ | A-5 | — | 30 | 2 | 35.0 | X | ○ | X | ◎ | X | X |
| Comp. Ex. 23 | 37 | B-5 | 60 | ″ | A-1 | 0 | 40 | 1 | 35.0 | ○ | ○ | X | ○ | ○ | ○ |

Consideration of Evaluation Results

Referring to the results of Table 5, Examples 1 to 29 having a base layer according to embodiments of the present disclosure, wherein the base layer had a sufficiently small thickness of greater than or equal to 0.5 μm and less than or equal to 2 μm, provided a positive electrode having significantly improved close contacting property and sufficiently small electrode plate resistance, compared with Comparative Example 1, even though a positive electrode mixed material layer had a sufficiently large loading amount of greater than or equal to 30 mg/cm$^2$. Because the base layer is made of an inactive material neither intercalating nor deintercalating lithium ions, thick coating thereof becomes disadvantageous in terms of improving volume energy density and weight energy density. In this respect, the base layers used in Examples 1 to 29 of the present disclosure were a thin film and thus beneficial or advantageous in terms of improving the energy density. In addition, according to Examples 1 to 29, when stored at a high temperature, the rechargeable battery cells were sufficiently suppressed from a resistance increase or a voltage drop caused by the detachment or peeling of positive electrode mixed material layers during the high-temperature storage.

As shown in Table 6, each rechargeable battery cell, which was manufactured in substantially the same manner as in Example 1 except that the loading amount of the positive electrode mixed material layer was changed into 25 mg/cm$^2$, 60 mg/cm$^2$, or 70 mg/cm$^2$, exhibited all the same very excellent coating property, electrode warpage, close contacting property, and electrode plate resistance as in Example 1. In addition, these rechargeable battery cells were all the same sufficiently suppressed from a resistance increase during the high-temperature storage or a voltage drop during the high-temperature storage as in Example 1.

of the acrylic acid ester-based copolymer was used in the base layer, the detachment or peeling off of the positive electrode mixed material layer was sufficiently suppressed, and high close contacting property was obtained.

In addition, comparing Examples 1 to 27 and Comparative Examples 2 to 4, less than or equal to 77.5 wt % of the content of the acrylic acid ester-based copolymer in the base layer turned out to suppress generation of electrode warpage. Comparing Example 4 with Example 13, a base layer having greater than or equal to 60 wt % of the content of the acrylic acid ester-based copolymer turned out to much improve the close contacting property. In addition, comparing Examples 1 to 29 with Comparative Examples 9 to 12, 14, 17, 18, 21, and 22, coating property of a base layer using polyacrylic acid as a dispersant turned out to be improved.

In addition, comparing Examples 1 to 29 with Comparative Examples 5 to 8, because polyacrylic acid used as a dispersant had a neutralization ratio of less than or equal to 25%, an increase in resistance or a voltage drop was sufficiently suppressed during the high-temperature storage. Comparing Examples 13 with 14, Example 15, Example 16 with Example 17, or Examples 21 and 23 with Example 22, the neutralization ratio of less than or equal to 10% was more desirable.

In addition, referring to the results of Examples 1 and 29 and Comparative Example 23, when a binder for a base layer had a glass transition temperature of greater than or equal to about −20° C. and less than or equal to about 15° C., an increase in resistance or a voltage drop was sufficiently suppressed during the high-temperature storage.

Each rechargeable battery cell manufactured in substantially the same manner as in Example 1, except that the roll temperature during the hot roll press to manufacture the

TABLE 6

| | Base layer composition | Binder: Material | Binder: Dried material Mass by part | Dispersion: Conductive filler | Dispersion: Dispersant | Dispersion: Neutralization degree (%) | Dispersion: Dried material Mass by part | Thickness of base Layla film (μm) | Loading amount of positive electrode mixture layer (mg/cm$^2$) | Coating properties | Electrode warpage | Close contacting property | Electrode resistance |
|---|---|---|---|---|---|---|---|---|---|---|---|---|---|
| Ex. 30 | 9 | B-1 | 60 | acetylene black | A-1 | 0 | 40 | 1 | 25.0 | ○ | ○ | ◎ | ◎ |
| Ex. 31 | 9 | B-1 | 60 | acetylene black | A-1 | 0 | 40 | 1 | 60.0 | ○ | ○ | ◎ | ◎ |
| Ex. 32 | 9 | B-1 | 60 | acetylene black | A-1 | 0 | 40 | 1 | 70.0 | ○ | ○ | ◎ | ◎ |

Comparing Examples 1 to 29 with Comparative Examples 13 to 22, an acrylic acid ester-based copolymer turned out to be desirable as a binder for a base layer. Although not described here, compared with the cases manufactured in substantially the same manner as in Example 1 except that the content of the acrylic acid ester-based copolymer was 40 wt %, Examples 1 to 27 exhibited a high close-contacting force. Referring to the results, when greater than or equal to 45 wt % of the content positive electrode mixed sheet was set to the conditions shown in Table 7, all exhibited sufficient coating property of the base layer, no electrode warpage, and sufficient close contacting property and thus suppressed electrode plate resistance to a low level. In addition, each of these rechargeable battery cells turned out to be sufficiently suppressed from an increase in resistance during the high-temperature storage or a voltage drop during the low temperature storage in substantially the same manner as in Example 1.

TABLE 7

| | Base layer composition | Roll temperature (° C.) | Roll rotation speed (m/min) | Loading amount of positive electrode mixture layer (mg/cm$^2$) | Coating properties | Electrode warpage | Close contacting property | Electrode resistance | Resistance increase during high-temperature storage | Voltage drop during high-temperature storage |
|---|---|---|---|---|---|---|---|---|---|---|
| Ex. 1 | 9 | 60 | 0.5 | 35.0 | ○ | ○ | ◎ | ◎ | ◎ | ◎ |
| Ex. 33 | 9 | 40 | 0.5 | 35.0 | ○ | ○ | ◎ | ◎ | ◎ | ◎ |
| Ex. 34 | 9 | 80 | 0.5 | 35.0 | ○ | ○ | ◎ | ◎ | ◎ | ◎ |

In addition, each rechargeable battery cell manufactured in substantially the same manner as in Example 1, except that the roll temperature and the roll speed during the hot roll press for manufacturing a positive electrode mixed sheet were set to conditions shown in Table 8, exhibited sufficient coating property of a base layer, no electrode warpage, and sufficient close contacting property and thus were suppressed from electrode plate resistance to a low level. In addition, each of these rechargeable battery cells turned out to sufficiently suppress an increase in resistance during the high-temperature storage or a voltage drop during the low temperature storage in substantially the same manner as in Example 1.

TABLE 8

| | Base layer composition | Roll temperature (° C.) | Roll rotation speed (m/min) | Loading amount of positive electrode mixture layer (mg/cm$^2$) | Coating properties | Electrode warpage | Close contacting property | Electrode resistance |
|---|---|---|---|---|---|---|---|---|
| Ex. 35 | 9 | 40 | 0.1 | 35.0 | ○ | ○ | ◎ | ◎ |
| Ex. 36 | 9 | 40 | 1 | 35.0 | ○ | ○ | ◎ | ◎ |
| Ex. 37 | 9 | 60 | 0.1 | 35.0 | ○ | ○ | ◎ | ◎ |
| Ex. 38 | 9 | 60 | 1 | 35.0 | ○ | ○ | ◎ | ◎ |
| Ex. 39 | 9 | 80 | 0.1 | 35.0 | ○ | ○ | ◎ | ◎ |
| Ex. 40 | 9 | 80 | 1 | 35.0 | ○ | ○ | ◎ | ◎ |

While the subject matter of this disclosure has been described in connection with what is presently considered to be practical example embodiments, it is to be understood that the present disclosure is not limited to the disclosed embodiments. On the contrary, it is intended to cover various modifications and equivalent arrangements included within the spirit and scope of the appended claims, and equivalents thereof.

What is claimed is:

1. An electrode for a non-aqueous electrolyte rechargeable battery, comprising:

a current collector, an electrode mixed material layer, and a conductive base layer between the current collector and the electrode mixed material layer, wherein the base layer includes a styrene-acrylic acid ester-based copolymer, a carbon material, and polyacrylic acid, a content of the styrene-acrylic acid ester-based copolymer is greater than or equal to about 45 wt % and less than or equal to about 77.5 wt % based on 100 wt % of the base layer, in the polyacrylic acid, a carboxy group is not neutralized or a ratio of a neutralized carboxy group neutralized by alkali metal ions among the carboxy groups is greater than about 0% and less than or equal to about 25%, and a loading amount of the electrode mixed material layer per one surface of the current collector is greater than or equal to about 15 mg/cm$^2$ and less than or equal to about 70 mg/cm$^2$.

2. The electrode of claim 1, wherein:

the loading amount of the electrode mixed material layer per one surface of the current collector is greater than or equal to about 25 mg/cm$^2$ and less than or equal to about 70 mg/cm$^2$.

3. The electrode of claim 1, wherein:

the loading amount of the electrode mixed material layer per one surface of the current collector is greater than or equal to about 30 mg/cm$^2$ and less than or equal to about 50 mg/cm$^2$.

4. The electrode of claim 1, wherein:

the base layer has a thickness of greater than or equal to about 0.5 μm and less than or equal to about 5 μm.

5. The electrode of claim 1, wherein:

the base layer has a thickness of greater than or equal to about 0.5 μm and less than or equal to about 2 μm.

6. The electrode of claim 1, wherein:

a glass transition temperature of the styrene-acrylic acid ester-based copolymer is greater than or equal to about −20° C. and less than or equal to about 15° C.

7. The electrode of claim 1, wherein:

the electrode mixed material layer further comprises polytetrafluoroethylene in an amount of greater than or equal to about 0.5 wt % and less than or equal to about 10 wt %.

8. The electrode of claim 1, wherein:

the polyacrylic acid has no neutralized carboxy group, or a ratio of the neutralized carboxy group in the polyacrylic acid is greater than about 0% and less than or equal to about 10%.

9. The electrode of claim 1, wherein:

a content of the styrene-acrylic acid ester-based copolymer is greater than or equal to about 60 wt % and less than or equal to about 70 wt % based on 100 wt % of the base layer.

10. The electrode of claim 1, wherein:

the carbon material is at least one selected from furnace black, channel black, thermal black, ketjen black, and acetylene black.

11. A non-aqueous electrolyte rechargeable battery, comprising:

the electrode of claim 1 as a positive electrode, a negative electrode, a separator between the positive electrode and negative electrode, and an electrolyte.

* * * * *